US006278898B1

(12) United States Patent
Shah

(10) Patent No.: US 6,278,898 B1
(45) Date of Patent: Aug. 21, 2001

(54) MODEL ERROR BOUNDS FOR IDENTIFICATION OF STOCHASTIC MODELS FOR CONTROL DESIGN

(75) Inventor: Sunil C. Shah, Los Altos, CA (US)

(73) Assignee: Voyan Technology, Santa Clara, CA (US)

( * ) Notice: Subject to any disclaimer, the term of this patent is extended or adjusted under 35 U.S.C. 154(b) by 0 days.

(21) Appl. No.: 09/345,640

(22) Filed: Jun. 30, 1999

Related U.S. Application Data

(60) Provisional application No. 60/128,226, filed on Apr. 7, 1999.

(51) Int. Cl.[7] .................................................. G05B 13/02
(52) U.S. Cl. .............................. 700/29; 700/30; 700/31; 700/44
(58) Field of Search ................... 700/51, 97, 29, 700/30, 31, 44; 702/2

(56) References Cited

U.S. PATENT DOCUMENTS

| | | | |
|---|---|---|---|
| 3,958,109 | * | 5/1976 | Doherty et al. ..................... 700/77 |
| 4,740,886 | * | 4/1988 | Tanifuji et al. ..................... 700/30 |
| 5,088,058 | * | 2/1992 | Salsburg ............................. 703/25 |
| 5,150,289 | * | 9/1992 | Badavas ............................. 700/34 |
| 5,483,448 | * | 1/1996 | Liubakka et al. .................. 701/37 |
| 5,486,996 | * | 1/1996 | Samad et al. ...................... 700/32 |
| 5,493,516 | * | 2/1996 | Broomhead et al. ............. 702/109 |
| 5,609,136 | * | 3/1997 | Tuken ................................ 123/357 |
| 5,784,596 | * | 7/1998 | Melamed et al. .................. 703/2 |
| 5,903,474 | * | 5/1999 | Sadler et al. ........................ 703/2 |
| 5,971,583 | * | 10/1999 | Ohnishi et al. ................... 700/98 |

OTHER PUBLICATIONS

New IEEE Standard Dictionary of Electrical and Electronics Terms 5th Ed. (Jan. 1993), p. 466.

Yu–Cai Zhu, "Black–Box Identification of Mimo Transfer Functions: Asymptotic Properties of Prediction Error Models", EE. Eindhoven University of Technology, NL–5600 MB Eindhoven, The Netherlands, International Journal of Adaptive Control and Signal Processing, vol. 3, 357–373 (1989). (Month unknown).

* cited by examiner

Primary Examiner—Paul P. Gordon
(74) Attorney, Agent, or Firm—Blakely, Sokoloff, Taylor & Zafman

(57) ABSTRACT

A method for computing model error bounds for system identification of stochastic systems is disclosed. The model error bounds take the form of additive frequency-weighted singular value bounds such that they are directly used in $H_\infty$ and $\mu$-synthesis robust control design methods. The largest singular value of the additive uncertainty bound is determined by performing a high number of simulations for the model uncertainty. Simulated values of the uncertainty are computed for a large data population, such that each candidate entry of simulated value lies on the 3-sigma ellipsoids defined by the covariance functions. For each simulated value of uncertainty, the maximum singular values are then determined. In order to determine the scalar uncertainty function needed for robust control design, the maximum over the population of the maximum singular values of uncertainty simulated values is then computed.

41 Claims, 4 Drawing Sheets

MODEL ERROR BOUNDS FOR IDENTIFICATION OF STOCHASTIC MODELS FOR CONTROL DESIGN

This application claims the benefit of U.S. Provisional Application No. 60/128,226, filed Apr. 7, 1999.

BACKGROUND OF THE INVENTION

1. Field of the Invention

This invention relates to the field of control system design, and more specifically, to model error bounds computation for system identification.

2. Background Information

Robust control system design entails designing a uncertainty-tolerant system such that the stability of the system is maintained for all perturbations which satisfy the uncertainty bounds. Uncertainty may take any forms such as noise or disturbance signals and transfer function modeling errors. Uncertainty must be quantified and its bounds must be found, in order to determine if the system will remain stable or to determine the worst-case behavior given the uncertainty. As such, it is desirable to know how large can the uncertainty be before instability occurs or before performance degrades beyond a bound. Various robust control designs have been developed such as $H_\infty$ and $\mu$-synthesis designs. $H_\infty$ robust control design enables stability performance and robustness properties of a system to be predicted with some certainty and it is developed to allow for modeling errors in system identification. The $\mu$-synthesis design method uses repeated iterations of an $H_\infty$ design algorithm and invokes the structured singular value of the transfer function matrix of a system to test whether the design is robust.

Currently available software design methods for determining the model error bounds for system identification of stochastic models are however unsuitable (or incompatible) for use with robust control design methods. One major drawback of the identification methods that account for stochastic processes is that they provide model error bounds that are in terms of covariance of estimated parameters of the model structure or covariance of estimated transfer functions. However, because robust control design requires model error bounds to take the specific form known as "additive or multiplicative frequency-weighted singular value bounds", the model error bounds in terms of covariance cannot be used directly in robust control design methods. There are several software design tools developed for robust control and system identification such as: Matlab® Control Module and System Identification Module, Matlab® $\mu$-synthesis Toolbox, Matlab® System Identification Toolbox (all available from Mathworks, Inc., Natick, Mass.), and MATRIXx® Robust Control Module and System Identification Module (available from Integrated Systems, Inc., Sunnyvale, Calif.). However, these current design tools do not allow computer automated or computer guided method to generate the model uncertainty from system identification in a mathematically compatible format usable in robust control design.

Moreover, for multi-input multi-output (MIMO) systems, the current design tools compute the self and cross variance of every pair of transfer function from the covariance of estimated parameters. These computations are impractical not only because the resulting pair-wise covariance cannot be directly used in robust control design, but also because these computations cannot be handled by ordinary workstations. Therefore, the available computing methods are laborious, time-consuming, and very expensive.

Additionally, when model order selection methods such as Akaike's Criterion, Modified Akaike's Criterion, or Rissanen's Minimum Descriptor Length Criteria are used with input-output data from closed-loop tests, biases in parameter estimates are unavoidable. These biases make model error bounds from covariance of estimated parameters incorrect. Thus, what is needed is a method for computing model error bounds for stochastic systems such that they are directly useable in $H_\infty$ and $\mu$-synthesis robust control design methods.

SUMMARY OF THE INVENTION

A method for computing model error bounds for system identification of stochastic models is disclosed. The model error bounds take the form of additive frequency-weighted singular value bounds such that they are directly used in $H_\infty$ and $\mu$-synthesis robust control design methods. The model error bounds are used in identification trajectory refinement and other control design cycles.

The method for computing the model uncertainty consists of the following steps: a closed-loop input-output trajectory is obtained by exciting the plant, and the input and output signals are thus collected; a high order ARX model estimate is selected and parameter estimates and residual signal are calculated; using the input signal and the calculated residual signal, the joint multivariate spectral density function is then computed; the noise sequence estimate and its spectral density function are also computed in order to further compute the covariance of multivariable transfer functions; and, using the covariance results, the estimate of the largest singular value of the additive uncertainty bound is then computed.

The largest singular value of the additive uncertainty bound is determined by performing a high number of simulations of the model uncertainty. Simulated values of the uncertainty are computed for a large data population, such that each candidate entry of simulated value lies on the 3-sigma ellipsoids defined by the covariance functions. For each simulated value of uncertainty, the maximum singular values are then determined. In order to determine the scalar uncertainty function needed for robust control design, the maximum over the population of the maximum singular values of uncertainty simulated values is then computed.

Additional features and benefits of the present invention will become apparent from the detailed description, figures, and claims set forth below.

BRIEF DESCRIPTION OF THE DRAWINGS

The present invention is illustrated by way of example and not limitation in the accompanying figures in which.

DETAILED DESCRIPTION

A method for computing model error bounds for system identification of stochastic models is disclosed. The model error (uncertainty) bounds take the form of additive frequency-weighted singular value bounds such that they are directly used in $H_\infty$ and $\mu$-synthesis robust control design methods. In the following description, numerous specific details are set forth in order to provide a thorough understanding of the present invention. It will be obvious, however, to one skilled in the art that these specific details need not be employed to practice the present invention. In other instances, well-known materials or methods have not been described in detail in order to avoid unnecessarily obscuring the present invention.

Figure 1:
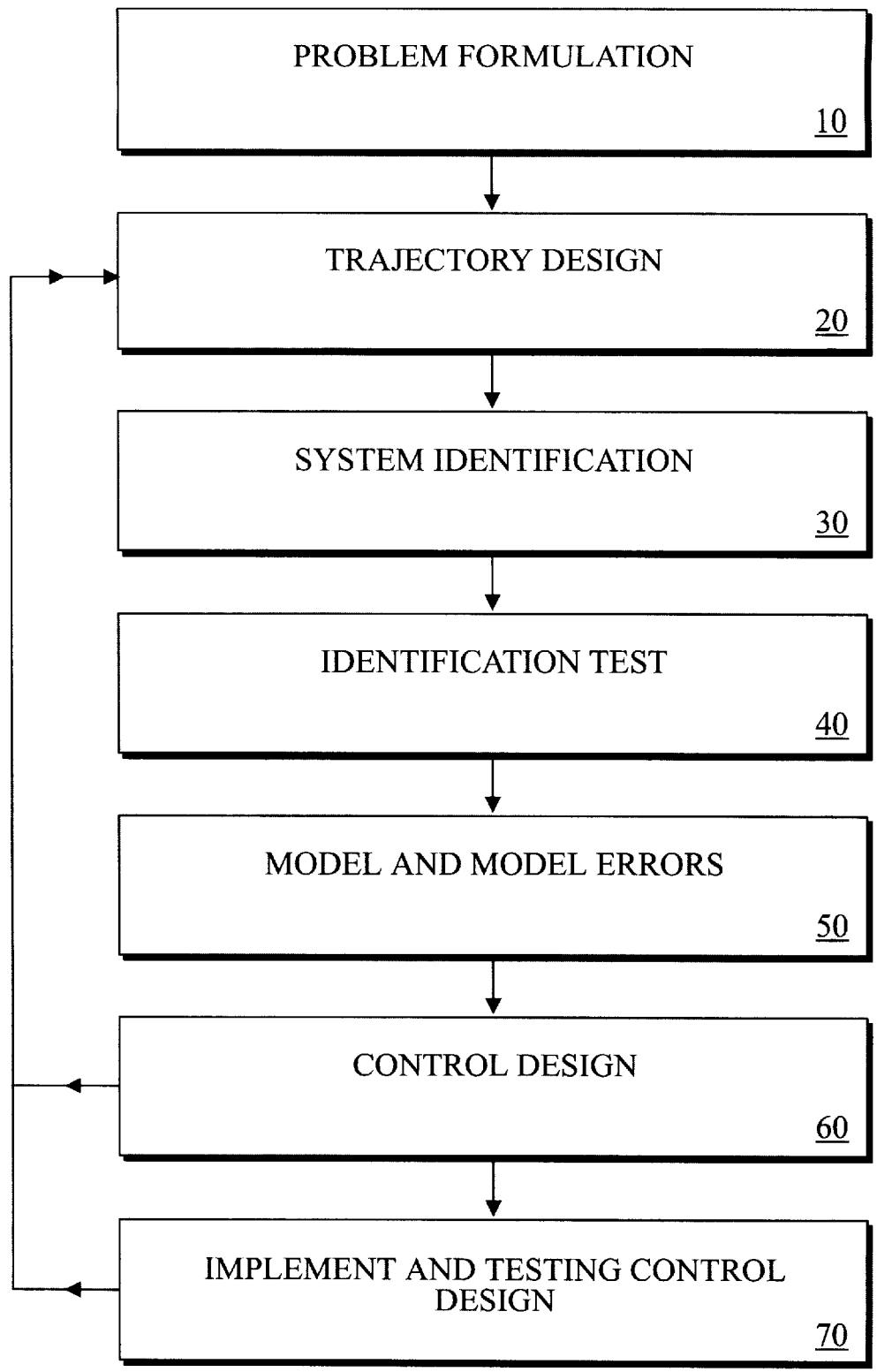
FIG. 1 is a diagram of a robust control design cycle.

FIG. 1 is a diagram of a typical design cycle for a robust control system. A more detailed description of a design cycle is described in: U.S. Pat. No. 5,880,959, entitled "Method for Computer-Aided Design of a Product or Process", issued on Mar. 9, 1999, assigned to the assignee herein, and also in Patent Application Ser. No. 09/345,172, filed on even date herewith, entitled "Real-Time Planner for Design", assigned to the assignee herein now U.S. Pat. No. 6,195,594 issued Feb. 27, 2001.

The design cycle illustrated in FIG. 1 consists of the following main steps: problem formulation 10, trajectory design 20, system identification 30, performing identification test 40, determining the ideal model and model errors 50, computing the control design 60, implementation and testing the control design on plant 70. Steps 20–70 are repeated until a good and reliable model is obtained and the model uncertainty is reduced. Each of the design steps consists of one or more tasks and may include local analysis and iterations based on the results of that analysis. For example, during the execution of trajectory design step 20, there are several iterative substeps which are described below with reference to FIG. 2.

Figure 2:
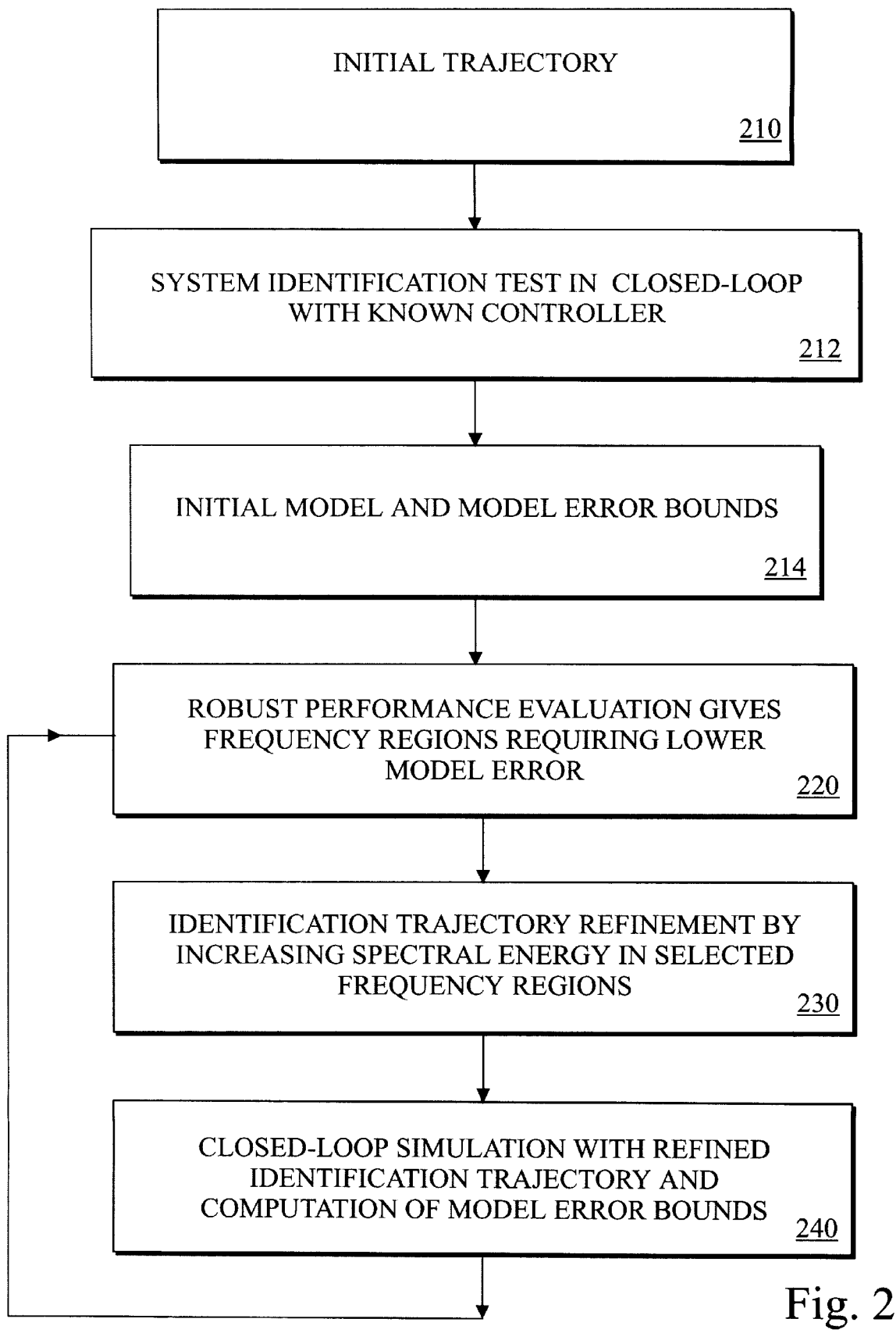
FIG. 2 a diagram of a simplified design cycle.

FIG. 2 illustrates a simplified design cycle consisting of several design steps which may utilize the model uncertainty computational method of the present invention. At step 210, an initial identification trajectory is generated. The trajectory provides information about the behavior of the plant and it allows the computation of model parameters and model error bounds. The initial identification trajectory has a known controller that keeps the plant under constant initial conditions.

Figure 3:
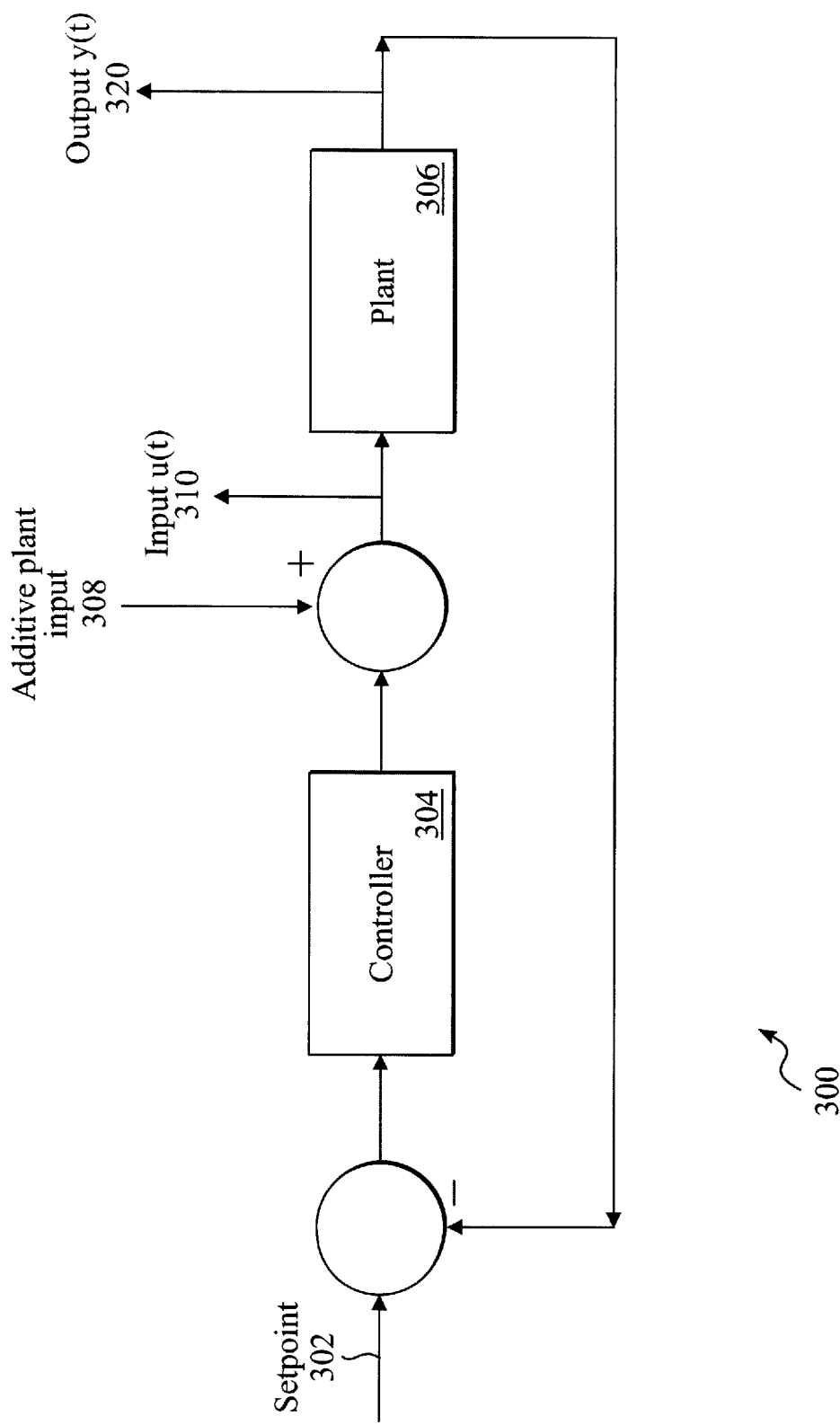
FIG. 3 a closed-loop block diagram for identification tests.

Using an initial identification excitation, provided at a closed-loop set point 302 or at an additive plant input 308 of the system illustrated in FIG. 3, closed-loop data is obtained by conducting a system identification test with a known controller at step 212. Data obtained from this identification test is used to obtain an initial model at step 214. Model error bounds estimates are also computed at step 214.

Once the initial model is determined in step 214, closed-loop input-output data is created from closed-loop simulations and estimates for the model error bound. At step 220, the robust system worst-case performance is determined using model uncertainty estimates. Based on these estimates, a further reduction in uncertainty may be necessary. If the model uncertainty needs to be further reduced, then the frequency regions requiring a lower model error are also determined at step 220.

The trajectory refinement is performed at step 230 by increasing the spectral energy in the selected frequency regions. Thus, a new trajectory with estimated error bounds is created at step 230. The predicted model error bounds are calculated at step 240 using a closed-loop simulation with a refined identification trajectory. It should be noted that steps 220–240 may be repeated as needed, i.e. as long as the predicted uncertainty requires further reduction.

The present invention is a method for determining the model uncertainty bounds. Thus, the present invention may be used in each of the design cycle steps illustrated in FIG. 2.

In system identification, input and output signals of plant are recorded and subjected to data analysis in order to find the best model for the plant. FIG. 3 illustrates a closed-loop system 300 which includes a plant 306 having input signal u(t) 310 and output signal y(t) 320. It should be noted that multiple inputs and multiple outputs may be present in system 300. Controller 304 controls the behavior of the plant 306.

The plant 306 is excited with a sufficiently rich excitation applied either at the setpoint 302 or the additive plant input 308. A closed-loop input-output trajectory is obtained which enables acquisition of input and output signals used in system identification. In one embodiment of the present invention, in order to achieve a sufficiently rich excitation, the plant is excited with an amplitude modulated chirp signal or a filtered pseudo-random binary sequence signal. When determining the optimal closed-loop trajectory, the plant is replaced by a stochastically accurate simulation of the plant using a previously identified model and a known controller.

In order to compute the model error bounds, the present invention utilizes a high-order Auto-Regressive with Exogenous variables (ARX) model estimate. The benefit of using the ARX model is that it allows the computation of unbiased or low-biased estimates when used with closed-loop data. Additionally, the ARX model allows very rapid computations of parameter estimates and model errors.

As such, the model uncertainty method according to the present invention computes a high order ARX model estimate for error model structure. The error model structure is represented by the linear difference equation (1) between the input u(t) 310 and output y(t) 320 of the plant 306, $$y(t)+a_1y(t-1)+ \ldots +a_ny(t-n)=b_1u(t-1) + \ldots +b_nu(t-n)+e(t), \quad (1)$$

where the residual signal e(t) represents noise sequence or external disturbance, $a_1 \ldots a_n$, $b_1 \ldots b_n$ are constant coefficients, and n represents the number of states in the model or number of time lags in the model.

For a multi-input multi-output (MIMO) system, equation (1) may be rewritten as following:

$$A(q)y(t)=B(q)u(t)+e(t), \quad (2)$$

where q represents the shift (time delay) operator and matrixes A(q) and B(q) are defined as:

$$A(q)=I+A_1q^{-1}+A_2q^{-2} + \ldots A_nq^{-n}, \quad (3)$$

$$B(q)=B_1q^{-1}+B_2q^{-2}+ \ldots B_nq^{-n}. \quad (4)$$

The input-to-output transfer function matrix G(q) and the noise-to-output transfer function matrix H(q) are defined as:

$$G(q)=A(q)^{-1}B(q), \quad (5)$$

$$H(q)=A(q)^{-1}, \quad (6)$$

such that equation (2) may be rewritten as following:

$$y(t)=G(q)u(t)+H(q)e(t). \quad (7)$$

Thus, equation (7) describes a linear system subject to additive disturbances, where the additive (noise) sequence is represented by:

$$v(t)=H(q)e(t). \quad (8)$$

Once the input and output signals u(t) and y(t) are collected and the high order ARX model estimate is selected and parameterized, the parameter estimates $A_1 \ldots A_n$ and $B_1 \ldots B_n$ are computed. Also the residual signal e(t) is computed for the data set.

It should be noted that the present invention uses a model with a high number of states in the range of two to three times the number of expected number of states in a minimal realization of the input-output behavior. Choosing a high number of states results in parameter estimates with negligible biases. An alternative way of choosing the model order to reduce parameter biases is to ensure that the resulting residual signals e(t) are uncorrelated to their past samples or to the past values of inputs u(t). Model order determination is discussed in Ljung, L., *System Identification-Theory for the User*, Prentice-Hall PTR (NJ), 1989, Chapter 16, pages 428–429.

The next step in determining the model uncertainty bounds is computing a joint multivariate spectral density function $\Phi_{zz}(\omega)$ using the computed residual signal e(t) and the input signal u(t) over a range of frequencies $\omega$, where $\omega$ takes values up to the Nyquist frequency (or half the sampling rate). The spectral density function $\Phi_{zz}(\omega)$ is given by the equation (9):

$$\Phi_{zz}(\omega) = \begin{bmatrix} \Phi_{uu} & \Phi_{ue} \\ \Phi_{eu} & \Phi_{ee} \end{bmatrix}, \quad (9)$$

where $\Phi_{uu}$, $\Phi_{ue}$, $\Phi_{eu}$, $\Phi_{ee}$ are spectral density functions corresponding to the input signal u(t) and residual signal e(t).

Using equation (8), the noise sequence v(t) is then computed from residual signal e(t). The noise sequence spectral density function $\Phi_{vv}(\omega)$ is also computed.

Using the computed spectral density functions $\Phi_{vv}(\omega)$ and $\Phi_{zz}(\omega)$, the covariance functions are then computed using equation (10):

$$Cov\left(Col\left(\begin{bmatrix} G(\omega) \\ H(\omega) \end{bmatrix}\right)\right) = \frac{n}{N}\Phi_{zz}^{-T}(\omega) \otimes \Phi_{vv}(\omega), \quad (10)$$

where $\otimes$ denotes the Kronecker Product, Cov denotes the covariance matrix, N denotes the data length used for identification, $\Phi_{zz}^{-T}(\omega)$ denotes the inverse transpose of spectral density function $\Phi_{zz}(\omega)$, and Col denotes the column vector of matrixes G($\omega$) and H($\omega$), where a column vector of a matrix B(k×l) is defined as:

$$Col(B) = \begin{bmatrix} B_1 \\ B_2 \\ \vdots \\ B_l \end{bmatrix} \text{ of size } (kl \times 1). \quad (11)$$

It should be noted that equation (10) is used for computations of covariance matrices in terms of G($\omega$), H($\omega$), and the cross-covariance of G($\omega$) and H($\omega$). The computation of the covariance matrix is discussed in Ljung, L., *System Identification-Theory for the User*, Prentice-Hall PTR (NJ), 1989, Chapter 9, and in Zhu, Y., Black-Box Identification of MIMO Transfer Functions: Asymptotic Properties of Prediction Error Models, International Journal of Adaptive Control and Signal Processing, Vol. 3, 357–373 (1989).

Considering the $H_\infty$ approach in robust control system design, it is desirable to find the model uncertainty upper bounds such that the stability and performance of a system is maintained for all perturbations which satisfy the bounds. As such, an analysis of the true properties with respect to the estimated properties of the system is performed. The true system will differ from the identified (estimated) system by a modeling error $\Delta(\omega)$. Thus, it is desirable to determine the true transfer function matrixes $G_o(\omega)$ and $H_o(\omega)$ such that the model uncertainty $\Delta(\omega)$ is as small as possible.

The additive model uncertainty $\Delta(\omega)$ corresponding to the input-to-output transfer function G($\omega$) is defined by equation (12):

$$G_O(\omega) - \hat{G}_N(\omega) = \Delta(\omega), \quad (12)$$

where $G_O(\omega)$ is the true input-output transfer function, $\hat{G}_N(\omega)$ is the identified (estimated) transfer function using the data.

The model uncertainty bounds are computed based on a scalar uncertainty function $l(\omega)$ needed for robust control design, such that the maximum singular value $\bar{\sigma}(\Delta(\omega))$ of the model uncertainty matrix is smaller than $l(\omega)$:

$$\bar{\sigma}(\Delta(\omega)) < l(\omega). \quad (13)$$

The additive model uncertainty bound corresponding to the noise-to-output transfer function H($\omega$) is respectively computed using equations similar to equations (12) and (13).

Figure 4:
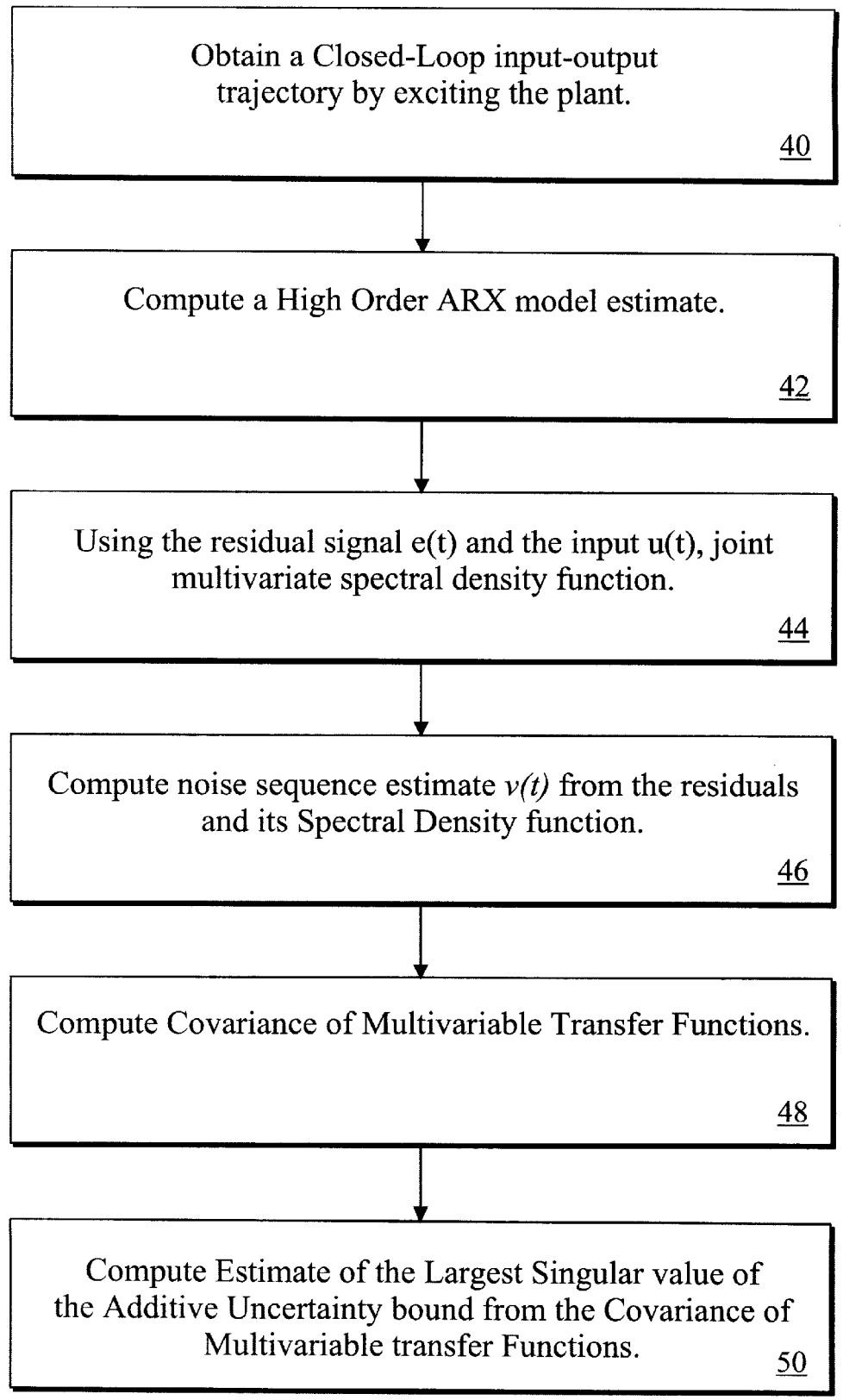
FIG. 4 is a flow diagram of the method for computing the model uncertainty.

FIG. 4 is a diagram of the method for computing the model uncertainty described above. At step 40, a closed-loop input-output trajectory is obtained by exciting the plant 306. The input and output signals are thus collected. Step 42 comprises selecting the high order ARX model estimate and calculating parameter estimates and residual signal e(t). Using the input u(t) from step 40 and the calculated residual signal e(t), at step 44 the joint multivariate spectral density function $\Phi_{zz}(\omega)$ is calculated. Step 46 comprises the computation of the noise sequence estimate v(t) and its spectral density function $\Phi_{vv}(\omega)$. At step 48, the covariance of multivariable transfer functions G($\omega$) and H($\omega$) is computed. Using the covariance results from step 48, the estimate of the largest singular value of the additive uncertainty bound is computed at step 50.

In a preferred embodiment of the present invention, step 50 comprises performing a high number of simulations of the model uncertainty $\Delta(\omega)$. Using equation (2) described above, simulated values of $\hat{\Delta}(\omega)$ are computed for a large data population (in the range of approximately 100 to 1,000), such that each candidate entry of simulated value $\hat{\Delta}_{simulated}(\omega)$ lies on the 3-sigma ellipsoids defined by the covariance functions of equation (2). For each simulated value $\hat{\Delta}_{simulated}(\omega)$, the maximum singular values are then determined. In order to determine the scalar uncertainty function $l(\omega)$ needed for robust control design, the maximum over the population of the maximum singular values of simulated values $\hat{\Delta}_{simulated}(\omega)$ is then computed. Equation (14) describes how the scalar uncertainty function $l(\omega)$ is determined:

$$l(\omega) = \max_{polulation}(\max_i(\sigma_i(\hat{\Delta}_{simulated}(\omega)))). \quad (14)$$

For a normal distribution (justified by the Central Limit Theorem), 3-sigma ellipsoids (bounding 99.7% of the population) are represented by:

$$\hat{\Delta}_{simulated} = 3 * Col_{n_u, n_y}^{-1}(P^{1/2}x), \quad (15)$$

where $Col_{n_u, n_y}^{-1}(y)$ denotes the inverse operation of reshaping the column vector into a matrix of size $n_u \times n_y$, where dim(y)=$n_y$, dim(u)=$n_u$, $P^{1/2}$ indicates a matrix square-root, and x represents unit random direction vectors such that $\|x\|=1$.

The matrix P represents the covariance function computed using equation (10) in step 48. For example, the covariance function corresponding to the input-to-output transfer function matrix is represented by equation (16):

$$P_G = cov(Col(G(\omega))). \tag{16}$$

Alternatively, the covariance function corresponding to the noise-to-output transfer function matrix is represented by equation (17):

$$P_H = cov(Col(H(\omega))). \tag{17}$$

As such, simulated values of the model uncertainty are computed for the transfer function matrixes $G(\omega)$ and $H(\omega)$ individually. In order to find an upper bound $l(\omega)$ for the model uncertainty for each transfer function matrix $G(\omega)$ and $H(\omega)$, the maximum over the population of the maximum singular values of $\hat{\Delta}_{simulated}(\omega)$ are determined for each transfer function matrix $G(\omega)$ and $H(\omega)$. Therefore, the additive model error bounds for system identification are found and stability of the control system may be predicted based on these bounds.

In one alternative embodiment of the present invention, the extensive simulation computations described above are avoided and the scalar uncertainty function $l(\omega)$ is computed using a single step. It should be noted, however, that the model error bounds are not as tight as the bounds determined by the simulation computations described above.

The $P_G$ and $P_H$ covariance functions are computed using the equations described above. The diagonals for $P_G$ and $P_H$ are then determined. For each diagonal($P_G$) and diagonal($P_H$), the model error bound $l(\omega)$ is computed using equation (18):

$$l(\omega) = \max_i \sigma_i(Col_{n_u n_y}^{-1}(3 * \text{diagonal}(P))), \tag{18}$$

$$\text{where diagonal}(P) = \begin{bmatrix} P_{11} \\ P_{22} \\ \vdots \\ P_{n_u n_y} \end{bmatrix}. \tag{19}$$

Thus, various embodiments for computing singular value model error bounds for system identification of stochastic systems have been described. The model error (uncertainty) bounds take the form of additive frequency-weighted singular value bounds such that they are directly used in $H_\infty$ and $\mu$-synthesis robust control design methods. In determining the singular value model error bounds, system adaptation with one layer variable may occur without instability.

It will be appreciated that the method for computing model error bounds described above may be used in various robust control system such as: processing systems (semiconductor furnaces), resonance systems (disk drive systems), or telecommunication systems (cell-phones). However, the applicability of the present invention is not limited to such systems.

The present invention allows the computation of parameter estimates with negligible biases. Additionally, using the method described above, very rapid computations of parameter estimates and model errors are accomplished. Although certain specific embodiments have been described, various modifications and changes to the disclosed embodiments will be apparent to one of ordinary skill in the art upon reading this disclosure. Therefore, it is to be understood that the specification and drawings are merely illustrative of and not restrictive on the broad invention, and that this invention is not limited to the specific embodiments shown and described.

What is claimed is:

1. A computer-implemented method for computing model error bounds of stochastic models for control design, said method comprising:
   computing a high order model estimate, wherein said model represents an auto-regressive with exogenous inputs model; and
   computing an estimate of the model error bounds, wherein said estimated model error bounds are represented by a singular value, and wherein said computing an estimate of said model error bounds comprises computing the largest singular value of said model error bounds.

2. The method of claim 1, wherein said the estimated model error bounds are represented by an additive, frequency-weighted singular value.

3. A computer-implemented method for computing singular values of model error bounds for a stochastic control system, said method comprising:
   computing a plurality of simulated values of said model error for a data population;
   determining a plurality of maximum singular values of said plurality of simulated values of said model error; and
   determining a scalar uncertainty function such that said model error is bounded by said scalar uncertainty function, wherein said determining a scalar uncertainty function comprises computing, for said data population, a maximum value of said plurality of maximum singular values.

4. The method of claim 3, wherein said scalar uncertainty function determines the largest singular value of said model error bounds.

5. The method of claim 4, wherein said largest singular value of said model error bounds is a frequency-weighted singular value bound.

6. The method of claim 3, wherein said model error bounds are additive model error bounds.

7. The method of claim 3, wherein each of said plurality of simulated values of said model error lies on a curve defined by a computed covariance of multivariable transfer functions, wherein said multivariable transfer functions describe said stochastic control system.

8. The method of claim 7, wherein said model error lies on 3-sigma ellipsoids curve.

9. A method for computing model error bounds of stochastic models for control design, said method comprising:
   computing a high order model estimate, wherein said model represents an auto-regressive with exogenous inputs model; and
   computing an estimate of said model error bounds, wherein said estimated model error bounds are represented by a singular value, and wherein said computing an estimate of said model error bounds comprises:
   computing a plurality of simulated values of said model error for a data population;
   determining a plurality of maximum singular values of said plurality of simulated values of said model error; and
   determining a scalar uncertainty function such that said model error is bounded by said scalar uncertainty function, wherein said determining a scalar uncertainty function comprises computing, for said data population, a maximum value of said plurality of maximum singular values.

10. The method of claim 9, wherein said scalar uncertainty function determines the largest singular value of said model error bounds.

11. The method of claim 10, wherein said largest singular value of said model error bounds is a frequency-weighted singular value bound.

12. The method of claim 9, wherein said model error bounds are additive model error bounds.

13. The method of claim 9, wherein each of said plurality of simulated values of said model error lies on a curve defined by a computed covariance of multivariable transfer functions, wherein said multivariable transfer functions describe said stochastic control system.

14. The method of claim 13, wherein said model error lies on 3-sigma ellipsoids curve.

15. A computer readable medium having stored thereon instructions for computing model error bounds of stochastic models for control design, wherein said instructions, when executed, cause the computer to:

compute a high order model estimate, wherein the model represents an auto-regressive with exogenous inputs model;

compute an estimate of the model error bounds, wherein the estimated model error bounds are represented by a singular value, and wherein said compute an estimate of the model error bounds comprises:

computing a plurality of simulated values of said model error for a data population;

determining a plurality of maximum singular values of said plurality of simulated values of said model error; and determining a scalar uncertainty function such that said model error is bounded by said scalar uncertainty function, wherein said determining a scalar uncertainty function comprises computing, for said data population, a maximum value of said plurality of maximum singular values.

16. The method of claim 15, wherein said scalar uncertainty function determines the largest singular value of said model error bounds.

17. The method of claim 16, wherein said largest singular value of said model error bounds is a frequency-weighted singular value bound.

18. The method of claim 15, wherein said model error bounds are additive model error bounds.

19. The method of claim 15, wherein each of said plurality of simulated values of said model error lies on a curve defined by a computed covariance of multivariable transfer functions, wherein said multivariable transfer functions describe said stochastic control system.

20. The method of claim 19, wherein said model error lies on 3-sigma ellipsoids curve.

21. A computer-implemented method for computing model error bounds of a stochastic model for control design, said method comprising:

determining a closed-loop representation of said stochastic model;

performing a closed-loop simulation of said stochastic model to generate input and output data for said stochastic model; and computing an estimate of the model error bounds, wherein said estimated model error bounds are represented by a singular value.

22. The method of claim 21 further comprising:

computing a high order model estimate using said input and output data, wherein said model represents an auto-regressive with exogenous inputs model, and wherein said computing an estimate of said model error bounds comprises computing the largest singular value of said model error bounds.

23. The method of claim 22, wherein said the estimated model error bounds are represented by an additive, frequency-weighted singular value.

24. The method of 23 further comprises refining an identification trajectory corresponding to said stochastic model using said estimated model error bounds.

25. The method of claim 24, wherein said refining said identification trajectory comprises increasing a spectral energy in a plurality of selected frequency regions.

26. The method of claim 21, wherein said computing an estimate of the model error bounds comprises:

computing a plurality of simulated values of said model error for said input and output data;

determining a plurality of maximum singular values of said plurality of simulated values of said model error; and determining a scalar uncertainty function such that said model error is bounded by said scalar uncertainty function, wherein said determining a scalar uncertainty function comprises computing, for said data population, a maximum value of said plurality of maximum singular values.

27. A computer-implemented method for computing model error bounds of a stochastic model for control design, said method comprising:

determining a closed-loop representation of said stochastic model;

performing an identification trajectory refinement corresponding to said stochastic model;

performing a closed-loop simulation of said stochastic model using said refined identification trajectory to generate input and output data for said stochastic model; and computing an estimate of the model error bounds, wherein said estimated model error bounds are represented by a singular value.

28. The method of claim 27 further comprising:

computing a high order model estimate using said input and output data, wherein said model represents an auto-regressive with exogenous inputs model, and wherein said computing an estimate of said model error bounds comprises computing the largest singular value of said model error bounds.

29. The method of claim 28, wherein said the estimated model error bounds are represented by an additive, frequency-weighted singular value.

30. The method of claim 29, wherein said refining said identification trajectory comprises increasing a spectral energy in a plurality of selected frequency regions.

31. The method of claim 28, wherein said computing an estimate of the model error bounds comprises:

computing a plurality of simulated values of said model error for said input and output data;

determining a plurality of maximum singular values of said plurality of simulated values of said model error; and determining a scalar uncertainty function such that said model error is bounded by said scalar uncertainty function, wherein said determining a scalar uncertainty function comprises computing, for said data population, a maximum value of said plurality of maximum singular values.

32. A computer-implemented method comprising:

computing a model error bound for a stochastic model of a control system, wherein said computing a model error bounds comprises computing a singular value of said model error bound; and performing an identification trajectory refinement of said stochastic model using said model error bound.

33. The method of claim 32 further comprising performing a closed-loop simulation of said stochastic model to determine input and output data of said stochastic model.

34. The method of claim 32 further comprising:

computing a high order model estimate, wherein the model represents an auto-regressive with exogenous inputs model; and computing an estimate of the model error bounds, wherein the estimated model error bounds are represented by a singular value, and wherein said compute an estimate of the model error bounds comprises:

computing a plurality of simulated values of said model error for a data population;

determining a plurality of maximum singular values of said plurality of simulated values of said model error;

determining a scalar uncertainty function such that said model error is bounded by said scalar uncertainty function, wherein said determining a scalar uncertainty function comprises computing, for said data population, a maximum value of said plurality of maximum singular values.

35. The method of claim 34, wherein said scalar uncertainty function determines the largest singular value of said model error bounds.

36. The method of claim 34, wherein said largest singular value of said model error bounds is a frequency-weighted singular value bound.

37. The method of claim 34, wherein each of said plurality of simulated values of said model error lies on a curve defined by a computed covariance of multivariable transfer functions, wherein said multivariable transfer functions describe said stochastic control system.

38. The method of claim 37, wherein said model error lies on 3-sigma ellipsoids curve.

39. The method of claim 34, wherein performing said identification trajectory refinement comprises an iterative trajectory refinement operation based on said estimated model error bound.

40. The method of claim 32, wherein said performing said identification trajectory refinement comprises increasing a spectral energy in a plurality of selected frequency regions.

41. The method of claim 32, wherein said model error bounds are additive model error bounds.

* * * * *